United States Patent [19]

Chen et al.

[11] Patent Number: 5,245,977
[45] Date of Patent: Sep. 21, 1993

[54] FLOW PROPORTIONING MIXER FOR GASEOUS FUEL AND AIR AND INTERNAL COMBUSTION ENGINE GAS FUEL MIXER SYSTEM

[75] Inventors: Tze-Ning Chen, Sudbury; Richard Mastronardi, Medfield, both of Mass.

[73] Assignee: Tecogen, Inc., Waltham, Mass.

[21] Appl. No.: 725,192

[22] Filed: Jul. 3, 1991

[51] Int. Cl.$^5$ .............................. B01J 8/20; F27B 8/08; F27B 8/09; F27B 8/12

[52] U.S. Cl. .................................. 123/590; 48/180.1; 123/337; 137/888; 137/892; 366/21; 422/108; 422/111; 422/112

[58] Field of Search .......................... 48/180.1, 189.4; 422/107-112; 123/337, 590; 366/341, 21, 151, 152; 137/888, 891, 892, 100; 261/40, 41.2, DIG. 78

[56] References Cited

U.S. PATENT DOCUMENTS

| | | |
|---|---|---|
| 1,052,051 | 2/1913 | Grimes . |
| 1,726,324 | 8/1929 | Udale . |
| 3,123,285 | 3/1964 | Lee .............................. 137/888 X |
| 3,334,876 | 8/1967 | Shorrock ....................... 261/41 |
| 3,464,803 | 9/1969 | Kimberley ....................... 48/180 |
| 4,088,715 | 5/1978 | Grayhill ........................ 261/36 |
| 4,132,752 | 1/1979 | Petermann ........................ 261/40 |
| 4,579,097 | 4/1986 | Yamamoto et al. ................ 123/438 |
| 4,670,195 | 6/1987 | Robson ......................... 261/41.5 |
| 5,012,788 | 5/1991 | Feldinger ....................... 123/590 X |
| 5,029,564 | 7/1991 | Neutzer ......................... 123/337 |
| 5,035,222 | 7/1991 | Feldinger ....................... 123/337 X |

Primary Examiner—James C. Housel
Assistant Examiner—Amalia Santiago
Attorney, Agent, or Firm—Lorusso & Loud

[57] ABSTRACT

A flow proportioning mixer is provided for mixing gaseous fuel and air, the mixer having therein a gas chamber adapted to discharge the gaseous fuel to a mixing channel, an air chamber adapted to direct the air into the mixing channel to mix with the fuel, a plunger reciprocally mounted in the mixing channel to define an annular passage in the channel, a pressure regulator for maintaining the pressure of the gas in the gas chamber and the air in the air chamber at a selected ratio, and a motor responsive to an engine exhaust content sensor to move the plunger in the mixing channel.

17 Claims, 3 Drawing Sheets

FLOW PROPORTIONING MIXER FOR GASEOUS FUEL AND AIR AND INTERNAL COMBUSTION ENGINE GAS FUEL MIXER SYSTEM

BACKGROUND OF THE INVENTION

1. Field of the Invention

This invention relates to devices and systems for mixing air and fuel for operation of internal combustion engines, and is directed more particularly to a flow proportioning mixer and system for use with internal combustion engines using gaseous fuel.

2. Description of the Prior Art

Concerns relative to fuel supplies and air quality have led to serious consideration of natural gas as an alternative to gasoline for use in internal combustion engines, and particularly in vehicular internal combustion engines. Some advantages of natural gas include little or no particulate emissions, reduced toxic emissions, and high octane rating which lends itself to higher engine compression ratios with consequent improvement in efficiency.

To convert vehicular gasoline engines to operate on natural gas, it is critical to control the flow of air and gaseous fuel such that an optimum fuel-air mixture is maintained at all times during operation of the engines. Normal operating conditions for internal combustion engines used in vehicles include fast transients on speed and power output, pronounced swings in air and/or fuel temperatures, and variations in fuel composition, all of which increase the difficulty of maintaining fuel-air mixtures within desired tolerances.

In general, the function of a mixer is to meter the gas flow rate according to the air flow rate, such that the two flow rates are maintained in proportion as the flow rates change.

There are essentially two known types of mixers designed to achieve the maintenance of proportioned flow rates. A first of the two general types utilizes a pressure differential across an orifice, or nozzle, in the air stream to (1) induce gas flow, or (2) control an orifice size in the gas stream. A second type involves measurement of air flow rate with a flow transducer, processing the air flow data in a computer to determine the required gas flow, and controlling a fuel injector to deliver the desired fuel flow.

Mixers of the first general type, employing pressure differential in the air stream to control gas flow, achieve the objective of maintaining a constant fuel-air ratio in a number of ways. One known type, in use for many years in industrial gas engines, applies a pressure differential generated by air flow on a diaphragm to modulate a gas valve. Some disadvantages to this type mixer are (1) the diaphragm is always in motion when engine power is varied continuously, as in normal vehicle operation, causing wear and consequently affecting the reliability of the mixer; (2) the response tends to be slow in the case of fast transient operation, leading to momentary deviations from the desired fuel-air flow ratio; and (3) the fuel-air flow ratio is affected by a number of operational parameters, making it difficult to obtain a constant fuel-air ratio over a wide range of engine power. Such disadvantages have not been important factors in industrial gas engines which operate at steady power for a majority of the time, but have a pronounced detrimental effect on emissions when applied to vehicular engines.

Another of the first general type of mixer is the venturi mixer, which utilizes Bernoulli's law to induce gas flow into the throat of a venturi in which there is air flow. The rate of gas flow is proportional to the rate of air flow and, in theory, should remain so, as long as the supply pressures of air and gas are equal and the temperatures of the air and gas remain constant. However, when the fuel temperature, or the air temperature, is changed, the fuel-air ratio will deviate from the selected value. Further, when the composition of the natural gas is changed, as from one supplier to another, the selected fuel-air ratio should be changed to achieve effective reduction of emissions. In short, the known venturi type mixers lack the flexibility required to vary the fuel-air ratio, as is needed in vehicular applications.

However, it remains true that venturi-type mixers are simple and reliable. It would be of great benefit to the motoring public and industry to have available a venturi-type mixer adapted to automatically react to changes in fuel composition and to changes in temperature of the gas and/or air, and, further, to be responsive to the continuously varying power demands of vehicular engines.

SUMMARY OF THE INVENTION

It is, therefore, an object of the invention to provide a fuel-air mixer of the venturi type suitable for use in conjunction with automotive internal combustion engines.

A further object of the invention is to provide an internal combustion engine gas fuel mixer system adapted for use with automotive vehicles.

With the above and other objects in view, as will hereinafter appear, a feature of the present invention is the provision of a flow proportioning mixer for mixing gaseous fuel and air, the mixer comprising a body member having therein an annular first chamber and a channel disposed radially inwardly of the first chamber, nozzles extending from the first annular chamber to the channel for directing the gaseous fuel from the first annular chamber to the channel, a housing fixed to the body member and defining a second chamber adapted to direct air into the channel to mix with the fuel, a plunger reciprocally mounted in the housing and disposed in the channel to define an annular passage in the channel, and a pressure regulator for maintaining the pressure of the fuel in the first chamber and the pressure of the air in the second chamber at a selected ratio.

In accordance with a further feature of the invention, there is provided a controller for controlling operation of a motive means for moving the plunger in the channel, a sensor disposed in an exhaust conduit leading from an internal combustion engine and in communication with the controller, whereby the plunger is adapted to move reciprocally in the channel in response to sensed content of exhaust gases from the engine.

The above and other features of the invention, including various novel details of construction and combinations of parts, will now be more particularly described with reference to the accompanying drawings and pointed out in the claims. It will be understood that the particular device and system embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention.

In the drawings.

DESCRIPTION OF THE PREFERRED EMBODIMENTS

Figure 1:
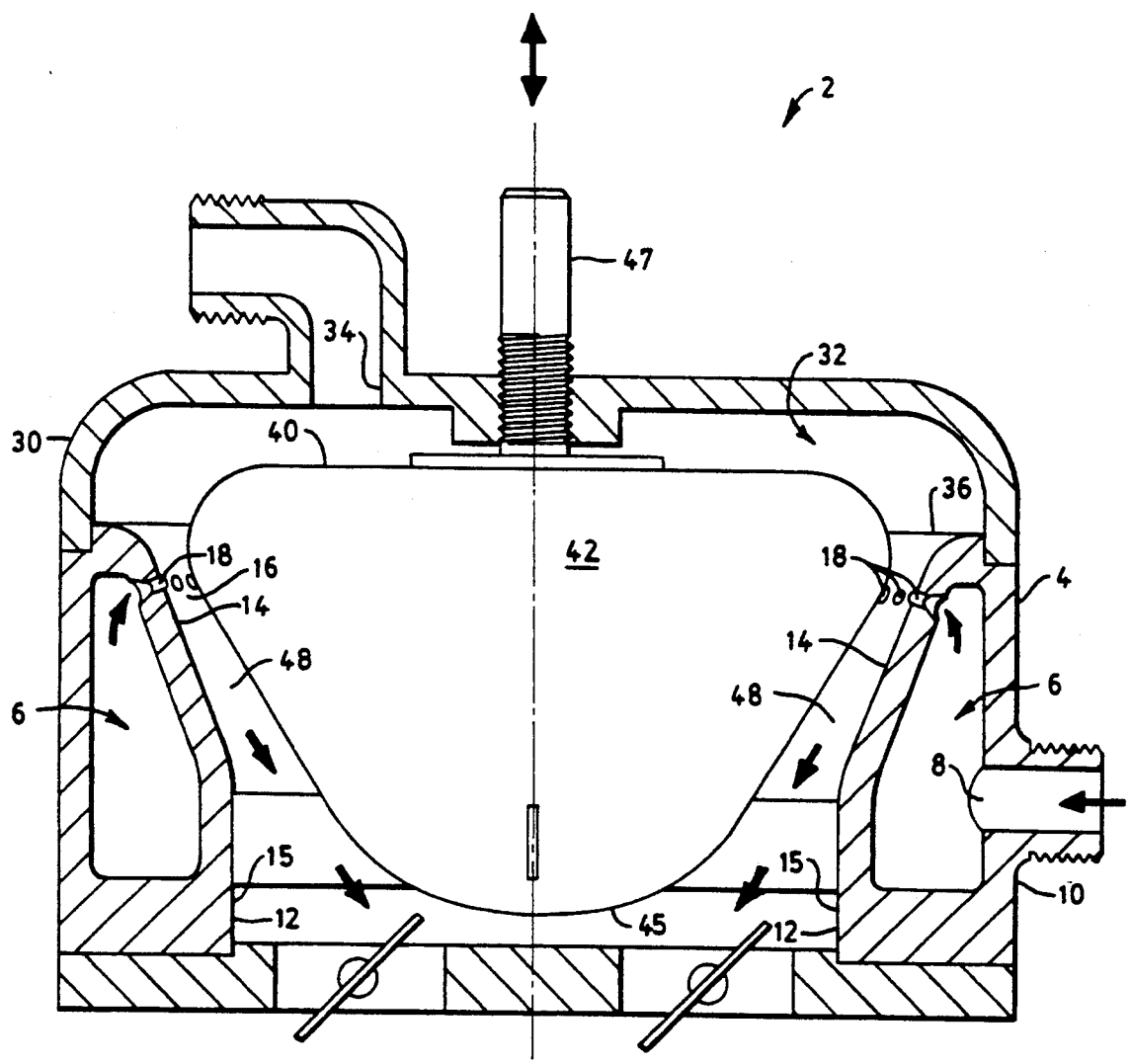
FIG. 1 is a diagrammatic sectional view of one form of a fuel-air mixer, illustrative of an embodiment of the inventive device.
Figure 2:
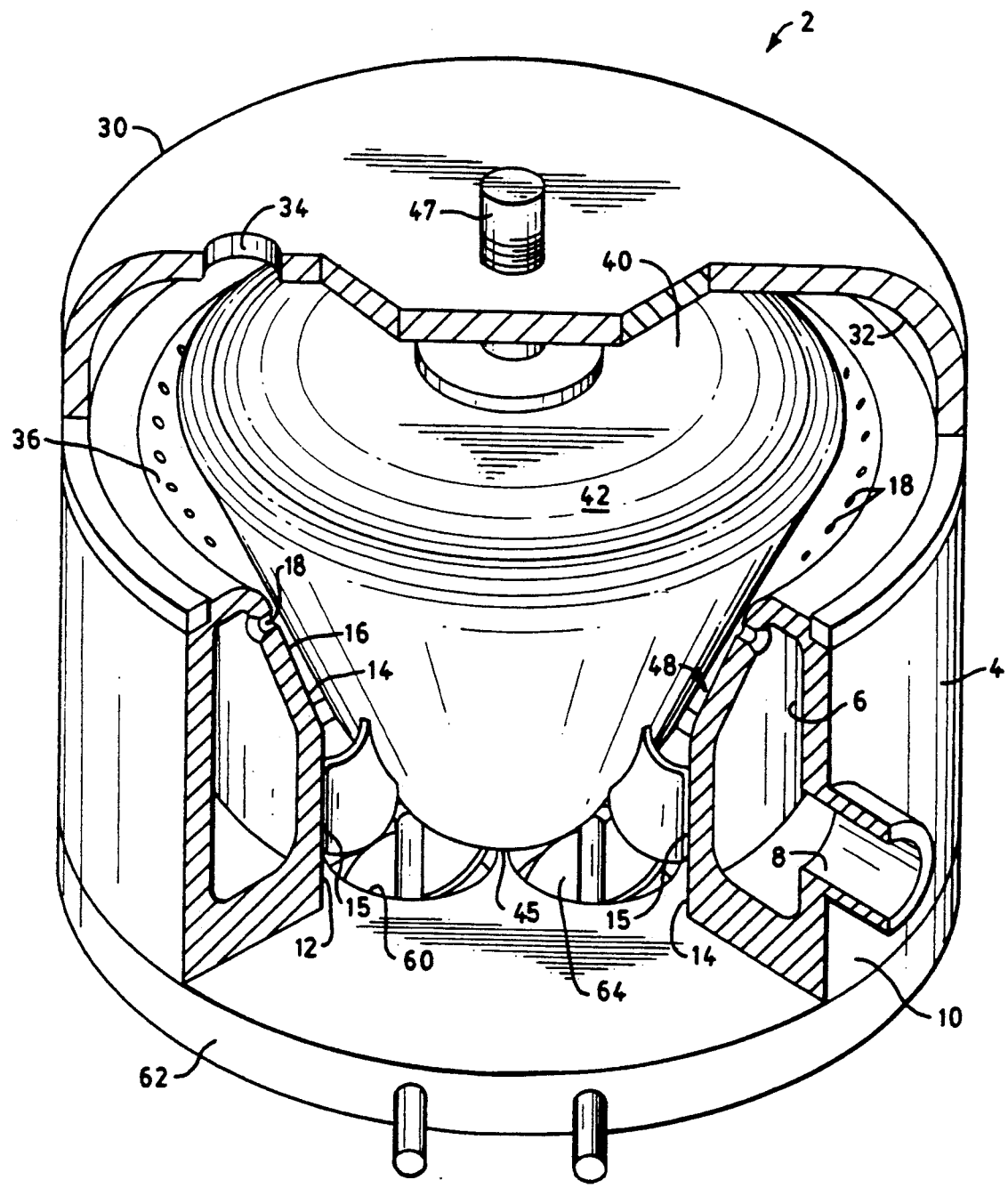
FIG. 2 is a perspective view, partly broken away, of the mixer shown in FIG. 1.

Referring to FIGS. 1 and 2, it will be seen that an illustrative embodiment of a flow proportioning mixer 2 for mixing of gaseous fuel (such as natural gas) and air includes a body member 4 having therein an annular first chamber 6 which serves as a repository and conduit for the gaseous fuel. The body member 4 is further provided with a first entry port 8 extending from an exterior wall 10 of the body member to the annular first chamber 6.

The body member 4 is provided with a channel 12 extending therethrough, the channel 12 being defined by an inside wall 14 of the body member 4, the wall 14 defining the channel 12 having a throat area 16. The channel 12 is disposed radially inwardly, or centrally, of the annular first chamber 6. The wall 14 extends downstream of the throat area 16 and has a wall portion 15 of cylindrical configuration, as shown in FIGS. 1 and 2, or in a slightly flared outwardly fashion (not shown).

The body member 4 is further provided with a plurality of nozzles 18 extending inwardly from the annular first chamber 6 to the channel 12, entering the channel 12 in the throat area 16. As an illustrative example, in a mixer for a seven liter internal combustion engine, the channel 12 in the area of the nozzles 18, i.e., the throat area 16, may have a diameter of about 3.25 inches and in the area of the cylindrical configuration 15 may have a diameter of about 2.35 inches. The length of the body portion 4, and therefore the channel 12, may be about 4.6 inches. The nozzles 18 may number about 36 and be formed by a No. 45 drill.

The first entry port 8, the first annular chamber 6, and the nozzles 18 are adapted, in cooperation, to convey the gaseous fuel from a gas supply line 20 (FIG. 3) to the channel 12 which serves as a mixing channel for mixing the fuel with air.

The mixer 2 further includes a housing 30 fixed to the body member 4 and defining a second chamber 32 and a second entry port 34 extending thereinto. The second chamber 32 has an opening 36 in communication with the channel 12.

A plunger 40 is mounted in the housing 30 and extends through the opening 36 and into the channel 12. The plunger 40 includes a bob 42, of generally conical shape, which is disposed in the channel 12 centrally of the nozzles 18, and which, in conjunction with the wall 14, defines in the channel 12 a venturi having the throat area 16. The plunger 40 is reciprocally movable by a motive means 44 (FIG. 3) for positioning the plunger 40, and particularly the bob 42, in the channel 12. The motive means 44 may, for example, comprise a stepper motor which rotates a threaded stem 47 of the plunger 40, so as to move the bob 42 in the upstream or downstream direction. The bob 42 tapers inwardly toward a downstream end 45 thereof in a manner such that an annular passage 48 defined in the channel 12 by the body member non-converging walls 15 and the bob 42, expands in a downstream direction. Alternatively, as noted above, the body member wall portion 15 may taper outwardly and the bob walls near the downstream end of the bob 45 either taper inwardly or be of a cylindrical configuration (not shown), that is, non-diverging, such that the annular passage 48 formed between the diverging walls 15 of the body member 4 and the non-diverging walls of the bob 42 expands in a downstream direction. Movement of the bob 42 in the channel 12 serves to expand or restrict the annular passage 48, but the passage 48 at all times expands downstream of the throat area 16. The bob 42 for the above-described illustrative example may be about 4.25 inches in length.

The second entry port 34, the housing second chamber 32, the opening 36 and the annular passage 48 form a conduit adapted to convey air from an air source 46 to and through the channel 12.

The body member 4, the housing 30, and the plunger 40 are preferably of an easily cast metal alloy, or of a strong and rigid plastic.

The mixer 2 further includes a pressure regulator 50 (FIG. 3) adapted to maintain the air pressure in the second chamber 32 and the gas pressure in the first chamber 6 at a selected ratio. While a ratio of 1:1 has been found acceptable, tests have indicated that an air pressure slightly exceeding, as by 1%, the gas pressure may be even more beneficial. Maintaining the pressure ratio at a selected value allows the fuel-air mass flow ratio to remain essentially constant for any fixed position of the bob 42.

Figure 3:
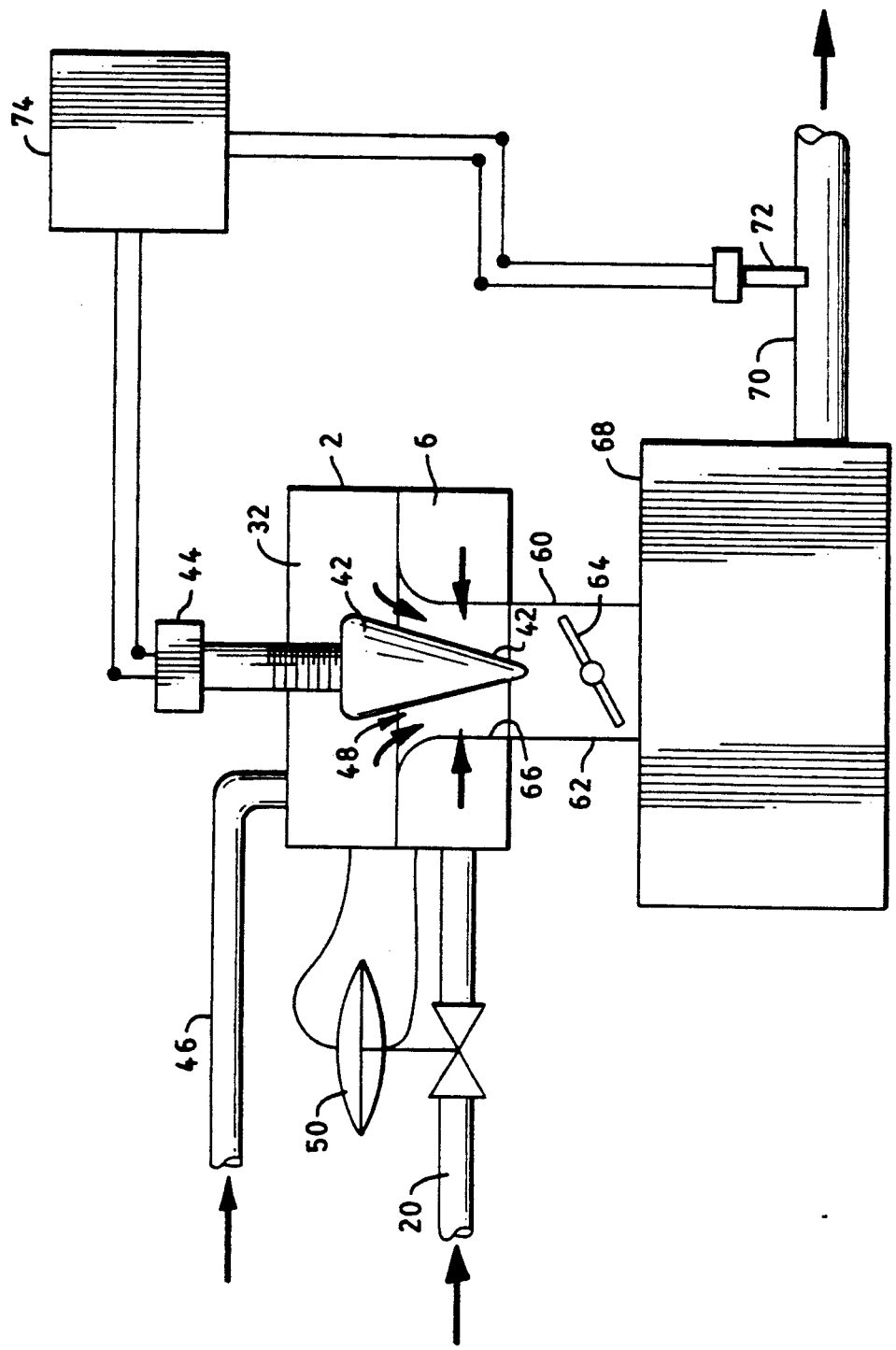
FIG. 3 is a diagrammatic view of an internal combustion engine gas fuel mixer system, illustrative of an embodiment of the inventive system and utilizing the mixer device shown in FIG. 1.

Referring to FIG. 3, it will be seen that the illustrative internal combustion engine gas fuel mixer system includes the above-described mixer 2, with the bob 42 and the motive means 44, and the pressure regulator 50. The system includes, in addition, a mixed fuel conduit means 60, which may be a throttle body 62, having throttle means 64 therein. The fuel conduit 60 interconnects a downstream end 66 of the mixer channel 12 and an internal combustion engine 68. In an engine exhaust conduit 70, there is disposed a sensor 72 adapted to measure a component of the engine exhaust gases, as for example, the oxygen content of the exhaust gases. A controller 74 is adapted to receive signals from the sensor 72 and, in response thereto, to energize the motive means 44 to move the bob 42 in the mixer channel 12.

For a fixed pressure differential between the chamber 32 and the downstream end 66 of the mixer channel 12, movement of the bob 42, for example, in the up-stream direction enlarges the annular passage 48, to increase the flow of air into the annular passage 48, thereby increasing the ratio of rate of flow of air relative to fuel gas. However, the pressure regulator 50 operates to maintain the selected pressure ratio between air and fuel gas in the respective chambers 32, 6, even while the flow rate ratio is changing.

In an illustrative operation, the sensor 72 might signal the controller 74 that there is a presence in the exhaust carried in the exhaust conduit 70 of the engine 68 of less than a selected amount of oxygen. The controller 74 signals the motive means 44 to raise the bob 42 to admit more air into the channel 12, while the pressure regulator 50 operates to maintain the pressures in the gas and air chambers at a ratio of 1:1, or other selected ratio. Thus, regardless of the change in air to gas flow ratio, the pressures in the air and gas chambers remain at the selected pressure ratio.

The expanding annular passage 48 provides for a smooth and gradual diffusion of flow, such that effective pressure recovery takes place. The pressure recovery experienced in the annular passage 48 downstream of the throat area 16 operates to minimize pressure loss and thereby maximize engine power. Further, pressure recovery permits, without deleterious effects, maximization of pressure differential between the air opening 36 and the throat area 16 to maximize driving potential for the fuel flow, facilitating maintenance of a selected fuel-air pressure ratio over a wide range of flow rates.

As noted above, the bob 42 is movable axially for changing the annular passage 48 area. Since the nozzles 18 remain of constant size, a change in the annular passage 48 area in the venturi throat affects directly the proportion of air to gas flow. Once the bob 42 is at a given position, the ratio of mass flow rates remains constant.

Any condition that changes the density of the air relative to the gas, such as a change in temperature or humidity of the air, causes the fuel-air mass flow ratio to deviate from the selected value. The bob 42 is axially adjustable to compensate for such changes. The mass flow rate of the air may typically be on the order of about 17 times that of the fuel gas. Accordingly, by adjusting the air flow area, a fine degree of control of the fuel-air flow rate ratio is achieved without the requirement of undue precision.

Other changes which can be accommodated by a change in the fuel-air mass flow rate ratio include a change in fuel composition, as from one location to another or from one season to another.

During a normal driving cycle, there is no need to move the bob 42. The bob is only occasionally activated when needed for fine tuning of the flow rate proportion. In normal operation of the vehicle, to obtain the acceleration of the vehicle, the throttle means 64 is opened, causing air flow into the engine 68 and through the mixer 2 to increase. The increased air flow causes static pressure at the throat area 16 of the venturi to decrease. The lower pressure at the throat area 16 causes the gas flow through the gas nozzles 18 to increase proportionally to the increase in air flow, provided that the gas pressure in the first chamber 6 is adjusted to the desired proportional pressure of air in the second chamber 32. Because of the increased gas flow, the gas pressure in the first chamber 6 tends to drop if the supply of gas to the first chamber is not increased accordingly. The gas pressure regulator 50 constantly adjusts and maintains the gas pressure in the first chamber 6 to equal the pressure of the air in the second chamber 32, or at another selected ratio.

In the case of decreasing engine power and air flow rate, the venturi throat pressure rises, causing gas flow to decrease. The lower gas flow tends to cause the gas pressure in the first chamber 6 to rise. However, the gas regulator 50 reduces the gas supply to the first chamber to keep the first chamber pressure in proper relationship with the second chamber air pressure, and thereby with the venturi air pressure.

Accordingly, the mixer 2 is a fundamentally simple and reliable device, providing the fuel-air mixture control required for the demands of automotive applications and for effective emission reduction.

It is to be understood that the present invention is by no means limited to the particular construction herein disclosed and/or shown in the drawings, but also comprises any modifications or equivalents within the scope of the claims.

Having thus described our invention, what we claim as new and desire to secure by Letters Patent of the United States is:

1. A flow proportioning mixer for mixing a gaseous fuel and air, said mixer comprising:
   a body member having inner and outer walls defining therebetween an annular first chamber, a first entry port for admitting a gaseous fuel extending through said outer wall of said body member to said annular first chamber, said body member having a plurality of nozzles extending through from said inner wall of said annular first chamber, wherein said first entry port, said annular first chamber and said nozzles convey only said gaseous fuel from a gas supply line inwardly toward a central portion of said body member; a housing fixed to said body member and defining a second chamber and a second entry port for admitting air extending thereinto, said second chamber having an opening in communication with said body member; a plunger disposed centrally of, and surrounded by, said nozzles in said body member and with said body member inner wall defining an annular passage, said plunger being reciprocally movable for positioning said plunger centrally in said body member; wherein said second entry port, said housing, said opening of said second chamber, and said plunger form a conduit for conveying only air from an air source through said second entry port, to said annular passage; and a pressure regulator in communication with said first and second chambers and operative to maintain the pressure of gaseous fuel in said first chamber and the pressure of air in said second chamber at a selected ratio.

2. The flow proportioning mixer in accordance with claim 1 in which said plunger comprises a substantially conically shaped bob.

3. The flow proportioning mixer in accordance with claim 1 in which said annular passage includes a constricted throat portion.

4. The flow proportioning mixer in accordance with claim 3 in which said plunger tapers inwardly toward a distal end thereof in a manner such that said annular passage formed between said inner wall and said plunger expands in a direction away from said air chamber.

5. The flow proportioning mixer in accordance with claim 3 in which said body member inner wall forming said annular passage diverges from said throat portion toward a distal end thereof, and said plunger has walls non-diverging toward a distal end thereof, whereby said annular passage formed between said body member diverging inner wall and said plunger non-diverging walls expands in a direction away from said air chamber.

6. The flow proportioning mixer in accordance with claim 4 wherein said nozzles are disposed in said throat portion.

7. The flow proportioning mixer in accordance with claim 6 including a conduit extending from said distal end of said annular passage for conveying mixed air and fuel to an internal combustion engine.

8. The flow proportioning mixer in accordance with claim 7 including throttle means disposed in said conduit.

9. The flow proportioning mixer in accordance with claim 7 including motive means for reciprocally moving said plunger.

10. The flow proportioning mixer in accordance with claim 9 further including a controller for controlling operation of said motive means, a sensor to be disposed in an exhaust conduit leading from the engine and in communication with said controller, whereby said plunger is moved reciprocally in said body member in response to sensed content of exhaust gases from the engine.

11. An internal combustion engine gas fuel mixer system comprising:
   a mixer to be used in combination with an internal combustion engine for mixing gaseous fuel and air, said mixer comprising
      a body member having an inner wall and an outer wall defining therebetween an annular gas chamber, and having a gaseous fuel inlet in said outer wall, said inner wall having nozzles for discharging only said gaseous fuel into a mixer channel defined inwardly of said inner wall;
   means defining an air chamber for discharging only air to said mixer channel, said means further defining an air inlet for said air chamber;
   a movable bob member disposed in said mixer channel relative to said inner wall to selectively define an area of said channel open to flow of said air therethrough;
   a pressure regulator in communication with said gas chamber and said air chamber and operative to maintain the pressure of said fuel in said gas chamber and the pressure of said air in said air chamber at a selected ratio;
   means for conveying mixed gaseous fuel and air from said mixer channel to an internal combustion engine;
   motive means for moving said bob in said mixer channel; controller means for operating said motive means; and said system further comprising
   sensor means to be disposed at an exhaust location of an engine for sensing content of exhaust gas and in communication with said controller means;
   whereby said controller means in response to a signal from said sensor means operates said motive means to change the location of said bob in said mixer channel to modify flow of said air into said mixer channel.

12. The system in accordance with claim 11 wherein said bob comprises a substantially conically-shaped plunger movable reciprocally in said mixer channel and disposed centrally of said nozzles.

13. The system in accordance with claim 11 wherein said mixer channel comprises a constricted throat portion and said nozzles are disposed in said throat portion.

14. The system in accordance with claim 13 wherein said mixer channel is formed by said inner wall of said body member and said bob tapers inwardly toward a distal end thereof in a manner such that an annular passage formed in said channel by said inner wall and said bob expands in a direction away from said air chamber.

15. The system in accordance with claim 13 wherein said mixer channel is formed by said inner wall of said body member diverging from said throat portion in a direction away from said air chamber, and said bob has walls non-diverging toward a distal end thereof, whereby an annular passage formed in said channel by said body member diverging inner walls and said bob non-diverging walls expands in a direction away from said air channel.

16. The system in accordance with claim 11 and including throttle means mounted in said means for conveying mixed gas and air from said mixer channel to said internal combustion engine.

17. The system in accordance with claim 11 wherein said ratio of pressures is substantially 1:1.

* * * * *